(12) United States Patent
Bu et al.

(10) Patent No.: US 9,291,761 B2
(45) Date of Patent: Mar. 22, 2016

(54) BACKLIGHT AND LIQUID CRYSTAL MODULE

(71) Applicants: BOE Technology Group Co., Ltd., Beijing (CN); Beijing BOE Display Technology Co., Ltd., Beijing (CN)

(72) Inventors: Zhanchang Bu, Beijing (CN); Zhi Li, Beijing (CN); Fei Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 65 days.

(21) Appl. No.: 14/017,748

(22) Filed: Sep. 4, 2013

(65) Prior Publication Data
US 2014/0063850 A1      Mar. 6, 2014

(30) Foreign Application Priority Data
Sep. 5, 2012   (CN) .......................... 2012 1 0326406

(51) Int. Cl.
*G02F 1/13357*    (2006.01)
*F21V 8/00*    (2006.01)

(52) U.S. Cl.
CPC ............ *G02B 6/0011* (2013.01); *G02B 6/0088* (2013.01); *G02B 6/0093* (2013.01)

(58) Field of Classification Search
CPC ............ G02F 1/133615; G02B 6/0013; G02B 6/0015; G02B 6/0018; G02B 6/0035; G02B 6/005; G02B 6/0073; G02B 6/0086; G02B 6/0088; G02B 6/0093
USPC .......................... 362/621, 625, 628, 612, 613
See application file for complete search history.

(56) References Cited

U.S. PATENT DOCUMENTS

| | | | |
|---|---|---|---|
| 2009/0079900 A1* | 3/2009 | Ohta et al. ...................... | 349/58 |
| 2010/0073582 A1* | 3/2010 | Konno et al. ................. | 348/794 |
| 2010/0254157 A1* | 10/2010 | Choi ............................ | 362/606 |
| 2011/0026240 A1 | 2/2011 | Hayashi et al. | |
| 2011/0273631 A1* | 11/2011 | Hayashi ........................ | 348/790 |

(Continued)

FOREIGN PATENT DOCUMENTS

| | | |
|---|---|---|
| CN | 1847942 A | 10/2006 |
| CN | 101392884 A | 3/2009 |

(Continued)

OTHER PUBLICATIONS

English abstract of CN1847942A, 1 page.

(Continued)

*Primary Examiner* — Julie Bannan
(74) *Attorney, Agent, or Firm* — Ladas & Parry LLP

(57) ABSTRACT

A backlight and a liquid crystal module having the same are provided. The backlight comprises: a light guide plate, a light-guide-plate fixing element for fixing the light guide plate, and at least one light source disposed adjacent to the light guide plate, wherein the light-guide-plate fixing element is made of thermal-contractive material. As the light-guide-plate fixing element is made of thermal-contractive material, in a test environment of high temperature and high humidity, it is possible to ensure that the light guide plate can expand and contract freely without resistance; meanwhile; while at normal temperatures, as the tight-guide-plate fixing element is in contact with the light guide plate without gap therebetween.

7 Claims, 3 Drawing Sheets

(56) References Cited

U.S. PATENT DOCUMENTS

2013/0033657 A1* 2/2013 Li et al. .................... 349/60
2013/0258704 A1* 10/2013 Chen et al. ................ 362/602

FOREIGN PATENT DOCUMENTS

CN 101636685 A 1/2010
CN 102620218 A 8/2012

OTHER PUBLICATIONS

English abstract of CN101392884A, 2 pages.
English abstract of CN102620218A, 1 page.
The extended European search report issued by the European Patent Office on Jan. 30, 2014, 8 pages.
Office Action (Chinese language) issued by SIPO on Apr. 4, 2014, 7 pages.
English translation of Chinese language Office Action of Apr. 4, 2014, 4 pages.
Second Office Action issued by the Chinese Patent Office for Chinese Patent Application No. 201210326406X dated Aug. 19, 2014, 7pgs.
English translation of Second Office Action issued by the Chinese Patent Office for Chinese Patent Application No. 201210326406X dated Aug. 19, 2014, 5pgs.
Third Office Action (Chinese language) issued by the State Intellectual Property Office ("SIPO") on Nov. 15, 2014 for International Application No. 201210326406.X, 5 pages.
English translation of third Office Action issued by SIPO, on Nov. 15, 2014 for International Application No. 201210326406.X, 5 pages.

* cited by examiner

BACKLIGHT AND LIQUID CRYSTAL MODULE

CROSS REFERENCE TO RELATED APPLICATIONS

This application claims priority from Chinese National Application No. 201210326406.X filed on Sep. 5, 2012, the contents of which are incorporated herein by reference.

FIELD OF THE INVENTION

The present invention relates to the technical field of liquid crystal display, and especially to a backlight and a liquid crystal module.

BACKGROUND OF THE INVENTION

With continuous developments of liquid crystal display technology, liquid crystal modules (LCMs) have been widely used in electronic terminals such as mobile phones and tablet computers. However, as the liquid crystal display panel of a liquid crystal module does not have a light emitting function, a backlight is required to be disposed under the liquid crystal display panel to provide the light source that it needs, so as to achieve display effects.

As shown in FIG. 1, which is a schematic structural diagram of an existing liquid crystal module, the liquid crystal module comprises: a back plate 11, a bottom reflective film 12, a backlight 13, an optical sheet(s) 14, a liquid crystal display panel 15, etc. The backlight 13 is used to provide the light required by the liquid crystal display panel 15, so that the liquid crystal display panel 15 achieves display effects.

Specifically, as shown in FIG. 2, which is a schematic structural diagram of an exemplary existing backlight 13, the backlight 13 comprises: a light guide plate (LGP) 131, an LGP fixing element 132 for fixing the LGP 131, and at least one light source 133 disposed at a side of the LGP 131. The LGP 131 is used to, based on light diffusion principle, convert the light emitted from the light source 133 into planar light, which, after regulated by the optical sheet 14 in the liquid crystal module, such as diffused, deflected, converged and adjusted in angle, exits the liquid crystal display panel 15 in the liquid crystal module; the LGP fixing element 132 is used to implement fixture of the LGP 131, and to avoid the shake of the LGP 131 during the testing of the liquid crystal module and the problem of scratching the optical sheet 14 in the liquid crystal module due to the friction between the LGP 131 and the optical sheet 14 and thus affecting image quality of the liquid crystal display panel 15.

However, as the existing LGP 131 and the existing LGP fixing element 132 are usually made of thermal-expansive materials which expand with heat, such as polymethyl methacrylate (PMMA) or polycarbonate (PC), the LGP 131 and the LGP fixing element 132 both expand with heat during a test at a high temperature and a high humidity (refer to the schematic diagram of the backlight in a state of thermal expanding as shown in FIG. 3). Thus, at normal temperatures, when the LGP fixing element 132 is used to fix the LGP 131, a certain gap (usually about 0.3~1.2 mm) is usually preset between the LGP 131 and the LGP fixing element 132, so that the LGP 131 can freely expand and contract without resistance when it expands with heat. However, if the preset gap is too big, problems such as the shake of the LGP 131 will be easily incurred during a reliability test of the liquid crystal module, and the phenomenon of scratching the optical sheet 14 due to the friction between the LGP 131 and the optical sheet 14 and thus the lowering of the image quality of the liquid crystal display panel 15 will occur. If the preset gap is too small, then when the performance test of the liquid crystal module is conducted in an environment of high temperature and high humidity, the LGP 131 and the LGP fixing element 132 both expand with heat, and thus they block each other so that the LGP 131 becomes warped, abutting against the surface of the optical sheet 14, thereby affecting the image quality of the liquid crystal display panel 15.

SUMMARY OF THE INVENTION

According to embodiments of the present invention, a backlight is provided, which comprises: an LGP, an LGP fixing element for fixing the LGP, and at least one light source 133 disposed adjacent to the LGP, wherein the LGP fixing element is made of thermal-contractive material.

Preferably, at normal temperatures, the LGP fixing element is in contact with the LGP without gap therebetween.

The thermal-contractive material can be polyethylene subjected to irradiation treatment.

Said at least one light source can be disposed at a side of the light guide plate or under the light guide plate. The LGP can be made of polymethyl methacrylate (PMMA) or polycarbonate (PC).

The light source can be a light emitting diode (LED) or a cold cathode fluorescent lamp (CCFL).

According to embodiments of the present invention, a liquid crystal module is provided. The liquid crystal module comprises a backlight in accordance with the above-mentioned embodiment of the present invention.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION OF THE PREFERRED EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiments), without any inventive work, which should be within the scope of the invention.

Embodiment 1

Figure 4:
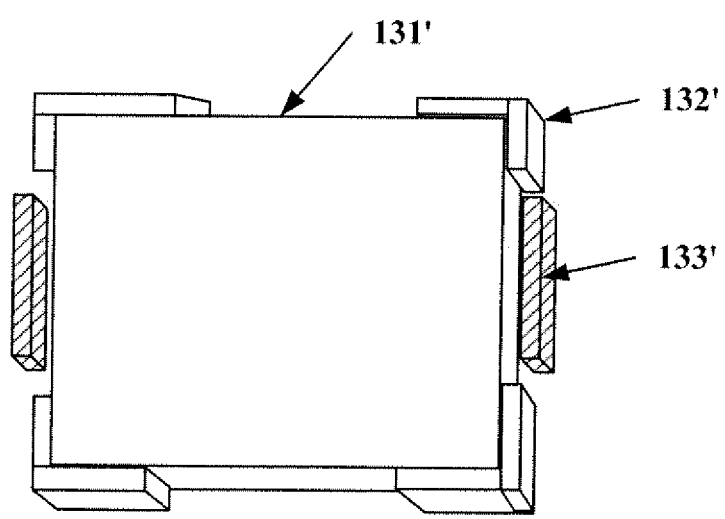
FIG. 4 is a schematic structural diagram of the backlight according to Embodiment 1 of the present invention.

As shown in FIG. 4, it is a schematic structural diagram of the backlight in Embodiment 1 of the present invention, and the backlight comprises: an LGP 131', an LGP fixing element 132' for fixing the LGP 131', and at least one light source 133' disposed adjacent to the LGP 131'.

The LGP fixing element 132' is made of thermal-contractive material, and, at normal temperatures, is preferably in contact with the LGP 131' without a gap therebetween. The thermal-contractive material can be materials such as polyethylene or the like, which have been subjected to irradiation treatment. Further, the LGP fixing element 132' can be disposed around the LGP 131' or at two adjacent sides or opposite sides of the LGP 131', etc., and the embodiment of the present invention is not limited in this regard in any way.

The LGP 131' is usually made of materials such as PMMA or PC, which expands with heat, and usually presents a shape of a right square prism or quadrangular prism with a rectangular bottom, and the embodiment of the present invention is not limited in this regard in any way.

Figure 5:
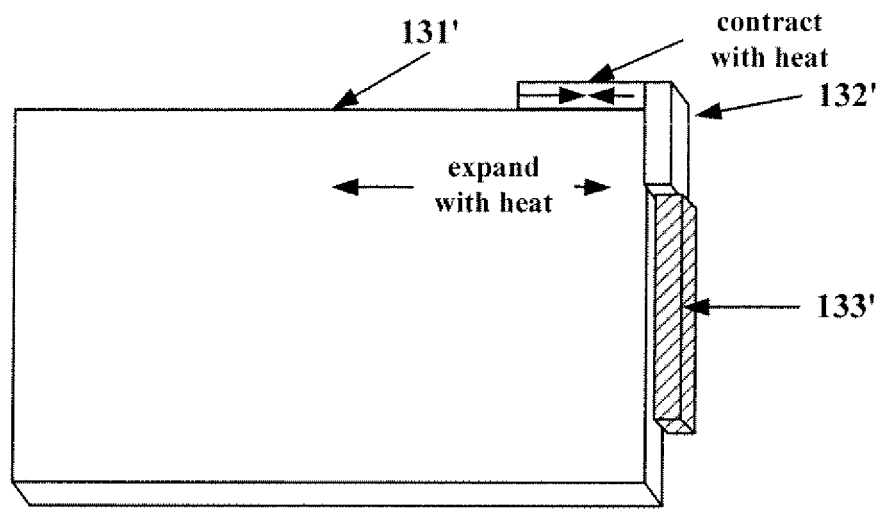
FIG. 5 is a schematic structural diagram of the backlight according to Embodiment 1 of the present invention when it is heated.

In the backlight according to Embodiment 1 of the present invention, in test environment of high temperature and high humidity, the LGP 131' will expand with heat, whereas the LGP fixing element 132' will contract with heat. Reference can be made to the schematic structural diagram of in FIG. 5 showing the backlight when it is heated. Further, to ensure that there is no resistance between the LGP 131' and the LGP fixing element 132' in test environment of high temperature and high humidity, the expansion and contraction extent of the thermal-contractive material along with a change in temperature can be appropriately set by way of adjusting the fabricating process of the thermal-contractive material. The expansion and contraction extent of the thermal-contractive material can be set as required, and the embodiment of the present invention is not limited in this regard in any way. For example, taking an LGP 131' having a size of 46 inches as an example, in a test environment of a temperature of 50° C. and a humidity of 80%, the overall expansion extent of the LGP 131' can be up to about 2 mm, and accordingly, the fabricating process of the thermal-contractive material can be adjusted such that the LGP fixing element 132' made of the thermal-contractive material only contracts about 1 mm at the temperature of 50° C., thereby avoiding the influence of the resistance between the LGP 131' and the LGP fixing element 132'.

Said at least one light source 133' can be disposed, for example, at a side of the LGP 131', and can be an LED or a COT. Further, as compared with a CCFL, since a LED has a small volume and can reduce the thickness of the backlight and thus the thickness of the liquid crystal module, in the embodiment of the present invention an LED can be preferably used as the light source 133'. It should be noted that, the light source 133' can be disposed at at least one side of the LGP 131', for example, at two opposite sides or two adjacent sides of the LGP 131', and etc., and the embodiment of the present invention is not limited in this regard in any way. In addition, it should be noted that, depending on the type of the backlight, said at least one light source 133' can also be disposed, for example, under the LGP 131'.

In the backlight according to Embodiment 1 of the present invention, an LGP fixing element 132' made of thermal-contractive material is used to fix the LGP 131'. Thus, during designing the structure of the backlight, it is no longer necessary to preset a gap between the LGP 131' and the LGP fixing element 132'. Therefore, at normal temperatures, the LGP can be fixed securely and the shake of the LGP is avoided, and the problem of scratching the optical sheet in the liquid crystal module due to the friction between the LGP and the optical sheet during the shake of the LGP and thus the affecting on image quality are avoided. In addition, in the backlight according to Embodiment 1 of the present invention, as the LGP fixing element 132' is made of thermal-contractive material, in a test environment of high temperature and high humidity, it is possible to ensure that the LGP 131' can expand and contract freely with resistance, thereby avoiding the problem that the LGP and the LGP fixing element both expand with heat, and thus they block each other so that the LGP becomes warped, abutting against the surface of the optical sheet, thereby affecting the image quality of the liquid crystal display panel.

Embodiment 2

Figure 6:
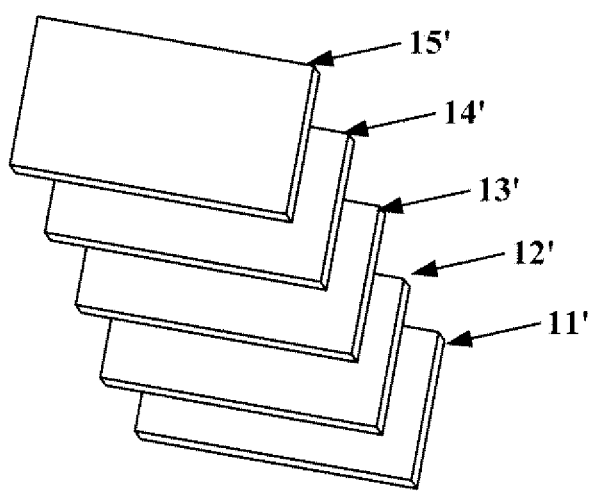
FIG. 6 is a schematic structural diagram of the liquid crystal module according to Embodiment 2 of the present invention.

As shown in FIG. 6, which is a schematic structural diagram of a liquid crystal module according to Embodiment 2 of the present invention, the liquid crystal module comprises: a backlight 13' in accordance with the above-described Embodiment 1 of the present invention. Further, the liquid crystal module also comprises: a back plate 11', a bottom reflective film 12', an optical sheet(s) 14', a liquid crystal display panel 15', and etc.

The backlight 13' comprises: an LGP 131', an LGP fixing element 132' for fixing the LGP 131', and at least one light source 133' disposed adjacent to the LGP 131', wherein, the LGP fixing element 132' is made of thermal-contractive material. Preferably, at normal temperatures, the LGP fixing element 132' is in contact with the LGP 131' without a gap therebetween. Said at least one light source 133' can be disposed at a side of the LGP 131', or under the LGP 131'.

Figure 1:
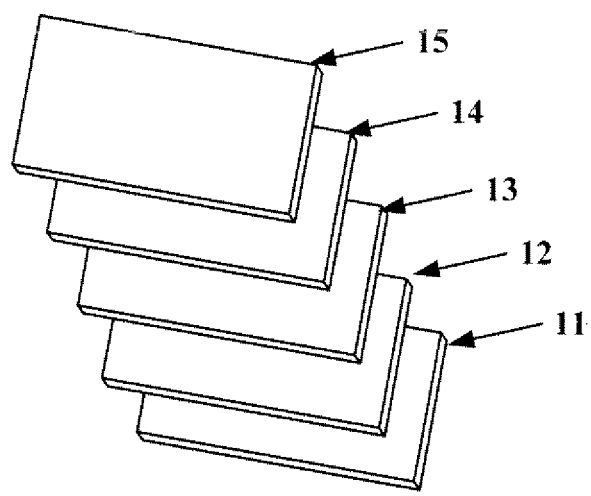
FIG. 1 is a schematic structural diagram of an existing liquid crystal module.
Figure 2:
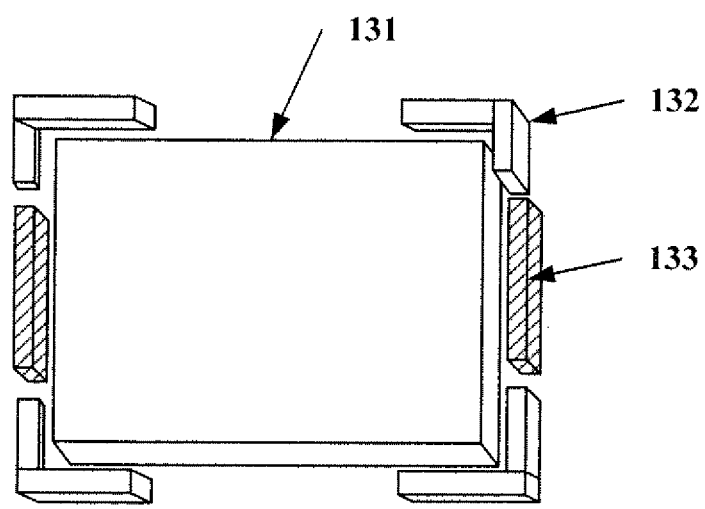
FIG. 2 is a schematic structural diagram of an existing backlight.
Figure 3:
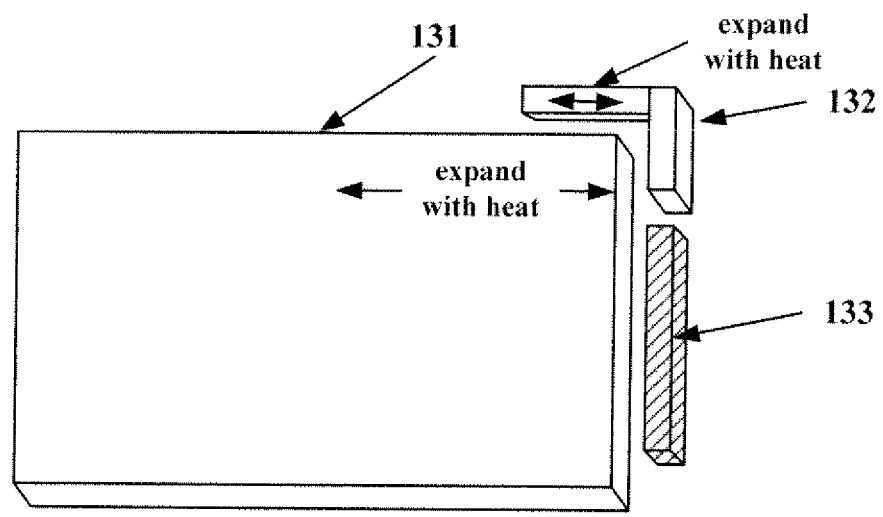
FIG. 3 is a schematic diagram of the existing backlight, which is expanding with heat.

It should be noted that, as compared with the existing liquid crystal module as shown in FIG. 1, the backlight 13' of the liquid crystal module according to Embodiment 2 of the present invention is a novel backlight (the LGP fixing element 132' in the backlight 13' employs a thermal-contractive material), while the back plate 11', the bottom reflective film 12', the optical sheet 14' and the liquid crystal display panel 15' as well as their positional relationships with respect to the backlight 13' can be in any suitable known forms.

The above are merely some of the embodiments of the present invention. Obviously, various changes and modifications can be made by the skilled in the art to the present invention, without departing from the spirits and the scope of the present invention. Therefore, so far as these changes and modifications fall in the scope of the claims and their equivalents of the present application, the present invention shall also intend to cover such changes and modifications.

What is claimed is:

1. A backlight, comprising: a light guide plate, a light-guide-plate fixing element for fixing the light guide plate, and at least one light source disposed adjacent to the light guide plate, wherein the light-guide-plate fixing element is made of thermal-contractive material, and the light-guide-plate fixing element is disposed at side edges of the light guide plate and only around four corners of the light guide plate.

2. The backlight according to claim 1, wherein at normal temperatures, the light-guide-plate fixing element is in contact with the light guide plate without gap therebetween.

3. The backlight according to claim 1, wherein the thermal-contractive material is polyethylene subjected to irradiation treatment.

4. The backlight according to claim 1, wherein said at least one light source is disposed at a side of the light guide plate or under the light guide plate.

5. The backlight according to claim 1, wherein the light guide plate is made of polymethyl methacrylate or polycarbonate.

6. The backlight according to claim 1, wherein the light source is a light emitting diode or a cold cathode fluorescent lamp.

7. A liquid crystal module, comprising a backlight, wherein the backlight comprises: a light guide plate, a light-guide-plate fixing element for fixing the light guide plate, and at least one light source disposed adjacent to the light guide plate, and wherein, the light-guide-plate fixing element is made of thermal-contractive material, end the light-guide-plate fixing element is disposed at side edges of the light guide plate and only around four corners of the light guide plate.

\* \* \* \* \*